United States Patent [19]
Ueki

[11] Patent Number: 5,240,096
[45] Date of Patent: Aug. 31, 1993

[54] FLUID PRESSURE CIRCUIT

[75] Inventor: Akihiro Ueki, Kanagawa, Japan

[73] Assignee: Nissan Motor Co., Ltd., Yokohama, Japan

[21] Appl. No.: 825,081

[22] Filed: Jan. 24, 1992

[30] Foreign Application Priority Data

Feb. 4, 1991 [JP] Japan .................. 3-033438

[51] Int. Cl.$^5$ .................. F16D 25/10; F16D 25/14
[52] U.S. Cl. .................. 192/87.11; 192/109 F; 60/415
[58] Field of Search .................. 192/3.57, 85 R, 87.1, 192/87.11, 87.14, 109 F; 60/413, 415; 138/31

[56] References Cited

U.S. PATENT DOCUMENTS

| | | | |
|---|---|---|---|
| 2,929,478 | 3/1960 | Tuck et al. | 192/87.14 X |
| 3,309,939 | 3/1967 | Pierce, Jr. | 192/109 F X |
| 3,501,979 | 3/1970 | Forster et al. | 192/109 F X |
| 4,138,846 | 2/1979 | Sakakibara | 60/413 X R |
| 4,161,895 | 7/1979 | Ushijima et al. | 192/109 F X |
| 4,219,109 | 8/1980 | Ushijima et al. | 192/109 F X |

FOREIGN PATENT DOCUMENTS 339328 11/1989 European Pat. Off. ........ 192/109 F
63-259256 10/1988 Japan .................. 192/3.57

OTHER PUBLICATIONS

"Nissan Automatic Transmission Service Manual RE5R01A", published in 1989, pp. A-53, A-55, and A-75.

Primary Examiner—Richard M. Lorence
Attorney, Agent, or Firm—Foley & Lardner

[57] ABSTRACT

A fluid pressure circuit for an automatic transmission allows a single accumulator to selectively provide a plurality of pressure adjustment characteristics. The fluid pressure circuit includes a directional control valve responsive to a value of a reverse clutch pressure $P_R$ relative to a threshold pressure $P_{CH}$, to connect either of a high-clutch pressure $P_H$ or the reverse clutch pressure $P_R$ with the accumulator such that the pressure adjustment characteristics for each are respectively different for eliminating a shifting time lag in the automatic transmission.

11 Claims, 2 Drawing Sheets

FLUID PRESSURE CIRCUIT

BACKGROUND OF THE INVENTION

1. Field of the Invention

The present invention relates generally to a fluid pressure circuit and more particularly to a fluid pressure circuit for controlling automotive automatic transmissions in which a single accumulator may provide a plurality of pressure adjusting characteristics.

2. Description of the Prior Art

In an accumulator for automotive automatic transmissions, various means have been proposed for selectably switching between a plurality of fluid passages to supply various fluid pressures to the accumulator. One such proposed means is disclosed in Nissan Automatic Transmission Service Manual RE5R01A, published in August, 1989. Referring to FIG. 3, the proposed system utilizes a directional control valve 50, and an accumulator 51 which are connected in a fluid circuit. The directional control valve is connected to a high clutch pressure via a port 50a, a reverse clutch pressure via a port 50b, as well as a forward clutch pressure via a port 50c and an accumulator 51 via a port 50d. Further a valve body 50e and a spring 50f, biased in the upward direction of FIG. 3, are also provided.

The valve body 50e is responsive to a pressure $P_F$ from the forward clutch at the port 50c, which acts as a switching pressure to move the valve body 50e within the directional control valve, with or against the spring force of the spring 50f, to communicate either of ports 50a or 50b with the port 50d for supplying either of the high-clutch pressure $P_H$ or the reverse clutch pressure $P_R$ to the accumulator 51.

The accumulator 51 is communicated with port 50d of the directional control valve via a port 51a and further receives a line pressure through a second port 51b. In addition a piston 51c is slidably disposed within the accumulator, the piston 51c is biased by a spring 51d in the upward direction of FIG. 3. Thus, the pressure $P_H$ or $P_R$ is introduced through the port 51a and acts on the piston 51c in cooperation with the spring force of the spring 51d. Opposing this action, line pressure is introduced through accumulator port 51b to act on the piston in the opposite direction. A balance established between these two opposing pressures determines a position of the piston 51c and thereby the pressure adjustment characteristics of either of the pressures $P_H$ or $P_R$.

In the above described prior art, since there is no relationship between the switching pressure $P_F$ and the pressures $P_H$ or $P_R$, the pressure adjustment characteristics of both the high-clutch pressure $P_H$ and the reverse clutch pressure $P_R$ are identical, as shown in FIG. 4. However, in the case of the reverse clutch pressure $P_R$, adjustment characteristics such as shown in FIG. 4 can lead to a time lag arising in certain shift sequences which may further lead to clutch slippage. Therefore, in hydraulic systems such as automatic transmissions, for example, it is preferable that selectively different pressure adjustment characteristics be available. It is further preferable that a plurality of selectively different pressure adjustment characteristics be providable by a single accumulator.

SUMMARY OF THE INVENTION

It is therefore a principal object of the present invention to provide a hydraulic circuit for automatic transmissions which enables a single accumulator to provide a plurality of selectable pressure adjustment characteristics.

In order to accomplish the aforementioned and other objects, a fluid circuit is provided, comprising: an accumulator communicated with a source of fluid line pressure through one port thereof; a first variable fluid pressure source communicable with the accumulator through a second port of the accumulator; a second variable fluid pressure source communicable with the accumulator through the second port of the accumulator; a directional control valve allowing fluid communication between the first variable fluid pressure source and the accumulator in a first condition and responsive to a predetermined fluid pressure value of the second variable fluid pressure source for terminating the first condition for establishing a second condition fluidly communicating the second variable fluid pressure source and the accumulator such that a fluid pressure changing characteristic of the second condition is different from a fluid pressure changing characteristic of the first condition.

According to another aspect of the present invention, a fluid circuit for an automotive automatic transmission is provided, comprising: an accumulator communicated with a source of fluid line pressure through one port thereof; a high-clutch establishing a first variable fluid pressure communicable with the accumulator through a second port of the accumulator; a reverse clutch establishing a second variable fluid pressure communicable with the accumulator through the second port of the accumulator; a directional control valve allowing fluid communication between the high-clutch and the accumulator in a first condition and responsive to a predetermined fluid pressure value from the reverse clutch for terminating the first condition for establishing a second condition fluidly communicating the reverse clutch and the accumulator such that a fluid pressure rising characteristic of the second condition is faster than a fluid pressure rising characteristic of the first condition.

DESCRIPTION OF THE PREFERRED EMBODIMENT

Figure 1:
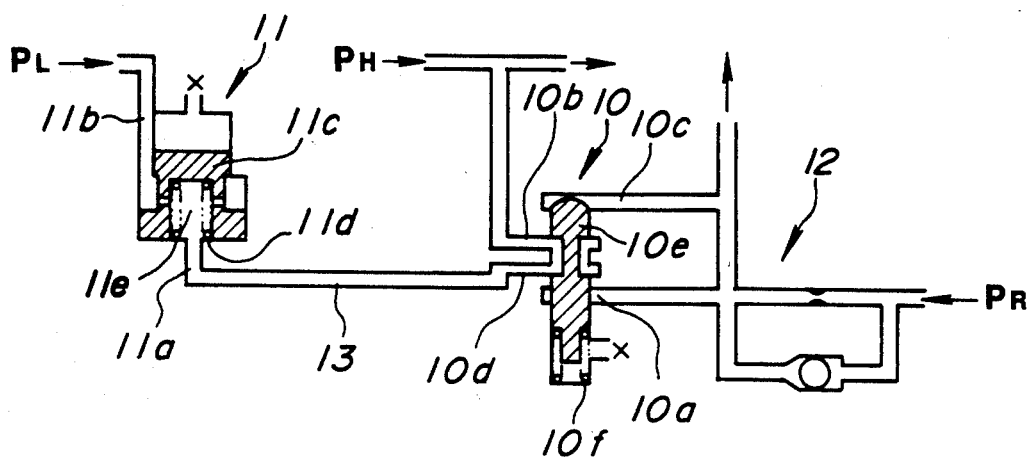
FIG. 1 is a schematic representation of a fluid circuit according the the present invention.

Referring now to the drawings, FIG. 1 shows a schematic diagram of a fluid circuit according to the present invention, as applied to an automatic transmission for automotive vehicles. In FIG. 1 a directional control valve 10 is associated with an accumulator 11. The directional control valve 10 is accessed by ports 10a-10d and, the directional control valve 10 further comprises a valve body 10e and a spring 10f. Port 10a receives a reverse clutch (not shown) pressure $P_R$ from a supply line 12. Ports 10a and 10c are both in communication with the supply line 12 and with the reverse clutch (not shown). Further, port 10b of the directional valve 10 receives high-clutch pressure $P_H$ from a high-clutch (not shown). Port 10d of the directional control valve 10 is communicated with a port 11a of the accumulator 11 via a supply line 13 for supplying pressure to the accumulator 11. The accumulator includes ports 11a and 11b as well as a piston 11c and spring 11d. As mentioned above, the port 11a is communicated with supply line 13, while port 11b receives line pressure $P_L$ from a line pressure circuit (not shown).

Next, the functioning of present invention as implemented in an automatic transmission will be explained.

The valve body 10e is movable, dependent upon the pressure signal $P_R$ present at the port 10c, to selectively allow communication between ports 10a and 10d, or ports 10b and 10d. That is to say, when the reverse clutch pressure $P_R$ reaches a predetermined threshold pressure $P_{CH}$, the valve body 10e is moved down against the force of the return spring 10f, in this position port 10a is communicated with port 10d.

Thus, when $P_R \leq P_{CH}$, ports 10b and 10d are in communication and the high-clutch pressure $P_H$ is supplied to the accumulator 11 and, when $P_R > P_{CH}$, communicating ports 10a and 10d, the reverse clutch pressure $P_R$ is supplied to the accumulator 11.

As mentioned hereinabove, the accumulator includes a slidably disposed piston 11c therein, the port 11a allows pressures $P_R$ or $P_H$ to act on a lower side of the piston 11c in cooperation with the spring 11d. That is to say, the spring 11d and the pressurized fluid (pressures $P_R$ or $P_H$) introduced through the port 11a, exert force on the piston 11c in the same direction (the upward direction of FIG. 1).

On the other hand, a port 11b introduces line pressure $P_L$ which opposes the force of the spring 11d to bias the piston in the downward direction of FIG. 1. Thus the position of the piston 11c is determined by a balance achieved between pressure $P_L$ and the opposing pressure $P_R$ or $P_H$ in conjunction with the force of the spring 11d. With this arrangement, a change in the position of the piston changes the value of the communicating pressure $P_H$ or $P_R$.

The operation of the directional control valve in the present invention will be explained with reference to FIG. 2, which shows a graph of the pressure adjusting characteristics according to the present invention.

Figure 2:
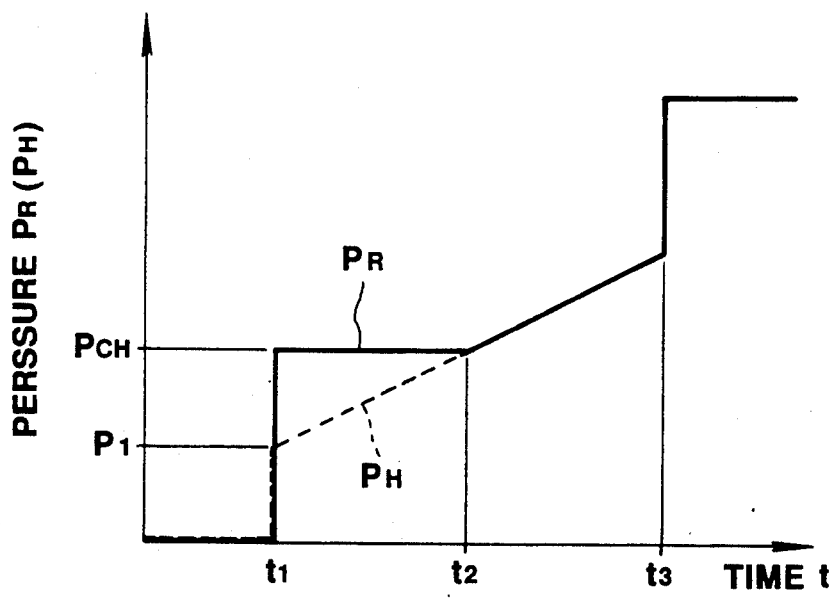
FIG. 2 is a graph showing pressure adjustment characteristics for a high-clutch pressure $P_H$ and a reverse clutch pressure $P_R$ according to the invention.
Figure 3:
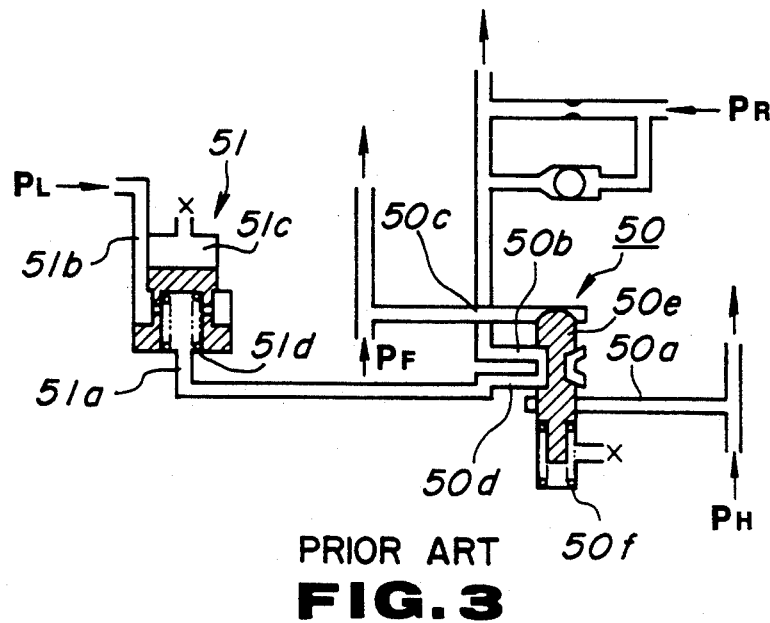
FIG. 3 is a schematic representation of a fluid circuit according to the prior art.

Referring to the example of FIG. 2, when the pressure of $P_R$ is lower than the threshold pressure $P_{CH}$ communication is maintained between ports 10b and 10d. As may be seen in FIG. 1, in this state the pressure $P_R$ is not introduced to the accumulator 11. At a time t1, the reverse clutch pressure $P_R$ rises abruptly to the threshold pressure $P_{CH}$, as shown by a solid line in FIG. 2. The reverse clutch pressure $P_R$ is then introduced through the port 11a to the lower fluid chamber 11e of the accumulator 11, and until a time t2, the reverse clutch pressure $P_R$ holds essentially at the threshold pressure $P_{CH}$. After time t2, at which time the reverse clutch pressure $P_R$ has been balanced against the line pressure in the accumulator 11, the pressure $P_R$ rises above the threshold pressure $P_{CH}$ and, opposing the spring force of the spring 10f of the directional control valve 10, the reverse clutch pressure $P_R$ may rise gradually until a time t3 at which the piston 11c of the accumulator 11 reaches its upper stroke limit. In this state a lower pressure limit for the reverse clutch pressure $P_R$ is the threshold pressure $P_{CH}$, below which the communication between the reverse clutch pressure $P_R$ and the accumulator 11 is cut off.

On the other hand, in the case of the high-clutch pressure $P_H$, as long as $P_R \leq P_{CH}$, the ports 10b and 10d of the directional control valve are communicated and the high-clutch pressure $P_H$ acts on the lower portion of the piston 11c of the accumulator 11.

Referring to FIG. 2, before a time t1 the high-clutch pressure $P_H$ is communicated with the accumulator 11 through the port 11a, as shown by a dotted line in FIG. 2. Then, at time t1 the high-clutch pressure $P_H$ jumps by a set pressure value P1. Beginning at the time t1 the pressure adjustment characteristics are different from that of the reverse clutch pressure $P_R$. In other words, the pressure adjustment is effected the same as in the conventional arrangement and the lower pressure limit is also identical with conventional systems (it will be noted that $P1 < P_{CH}$).

In the above described embodiment, by the relation between the threshold pressure and the reverse clutch pressure $P_R$, a very simple arrangement is provided by which an accumulator may be selectively supplied either by the reverse clutch pressure $P_R$ or high-clutch pressure $P_H$ with different adjustment characteristics being provided therefor.

By way of example, the operation of the present invention in relation to a shifting operation of an automatic transmission will be explained hereinbelow.

Figure 4:
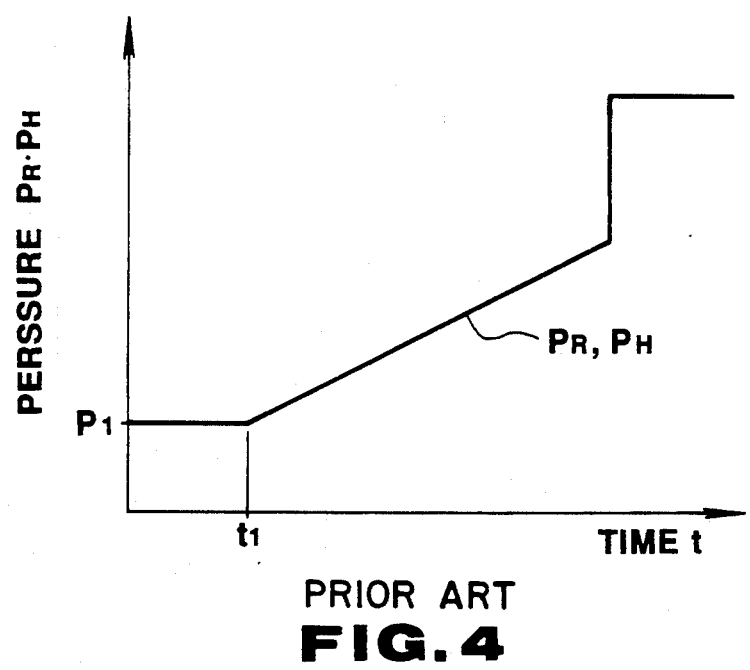
FIG. 4 is a graph showing the single pressure adjustment characteristic of the prior art.

In a case where an automotive automatic transmission is to shift from an N (neutral) range position to an R (Reverse) range, a time lag effect, usually present while the reverse clutch builds the necessary pressure to become ON, is eliminated. That is, in the prior art, when a shift selection is made from the N range to the R range, the reverse clutch pressure $P_R$, as shown in FIG. 4, rises slowly until the necessary ON pressure is reached. During this lag time there is a danger of clutch slippage. According to the present invention, as seen in FIG. 2, the reverse clutch pressure $P_R$ quickly rises to the threshold pressure $P_{CH}$. Further, the pressure value of $P_R = P_{CH}$ is set slightly higher than the reverse clutch ON pressure. Thus, the above mentioned time lag is almost completely eliminated. It will be noted that, although FIG. 2 shows the pressure $P_R$ rising to the value of $P_{CH}$ at a time t1, in actuality it takes a slightly longer time for this pressure jump to occur.

Thus in a fluid pressure circuit according to the present invention, optimum pressure adjustment characteristics may be provided for both high clutch and reverse clutch by a single accumulator. Furthermore, although the above-described embodiment is described in terms of reverse and high clutch pressures, other transmission operation may also benefit from the arrangement according to the present invention and, although the embodiment is drawn to an automotive automatic transmission, the present invention is further applicable to other types of hydraulic systems.

What is claimed is:

1. A fluid circuit comprising:
   an accumulator communicated with a source of fluid line pressure through one port thereof;
   a first variable fluid pressure source communicable with said accumulator through a second port of said accumulator;
   a second variable fluid pressure source communicable with said accumulator through said second port of said accumulator;
   a directional control valve, said second variable fluid pressure source further being fluidly communicated with said directional control valve via a plurality of ports thereof, said direct control valve allowing fluid communication between said first variable fluid pressure source and said accumulator in a first condition and responsive to a fluid pressure from said second variable fluid pressure source acting, at one port of said directional control valve, on a movable portion of said directional control valve to effect communication of said second variable fluid pressure source and said accumulator via a port other than said one port, for terminating said first condition for establishing a second condition fluidly communicating said second variable fluid pressure source and said accumulator such that a fluid pressure changing characteristic of said second condition is different from a fluid pressure changing characteristic of said first condition.

2. A fluid circuit as set forth in claim 1, wherein said first variable fluid pressure source is a high-clutch of an automotive automatic transmission.

3. A fluid circuit as set forth in claim 1, wherein said second variable fluid pressure source is a reverse clutch of an automotive automatic transmission.

4. A fluid circuit as set forth in claim 1, wherein said first variable fluid pressure source is fluidly communicated with said directional control valve via a single port thereof.

5. A fluid circuit as set forth in claim 1, wherein said fluid pressure changing characteristic of said second condition causes a fluid pressure value of the established fluid communication to rise faster than in said first condition.

6. A fluid circuit as set forth in claim 3, wherein said predetermined fluid pressure value is higher than a pressure necessary for turning said reverse clutch ON.

7. A fluid circuit as set forth in claim 1, wherein a lower fluid pressure limit of said second condition is said predetermined fluid pressure value and a lower pressure limit of said first condition is a pressure lower than said predetermined fluid pressure value.

8. A fluid circuit for an automotive automatic transmission comprising:
   an accumulator communicated with a source of fluid line pressure through one port thereof;
   a high-clutch establishing a first variable fluid pressure communicable with said accumulator through a second port of said accumulator;
   a reverse clutch establishing a second variable fluid pressure communicable with said accumulator through said second port of said accumulator;
   a directional control valve, said reverse clutch being fluidly communicated with said directional control valve via a plurality of ports thereof, said directional control valve allowing fluid communication between said high-clutch and said accumulator in a first condition and responsive to a fluid pressure from said reverse clutch acting, at one port of said directional control valve, on a movable portion of said directional control valve to effect communication of said reverse clutch and said accumulator via a port other than said one port for terminating said first condition for establishing a second condition fluidly communicating said reverse clutch and said accumulator such that a fluid pressure rising characteristic of said second condition is faster than a fluid pressure rising characteristic of said first condition.

9. A fluid circuit as set forth in claim 8, wherein said high-clutch is fluidly communicated with said directional control valve via a single port thereof.

10. A fluid circuit as set forth in claim 8, wherein said predetermined fluid pressure value is higher than a pressure necessary for turning said reverse clutch ON.

11. A fluid circuit as set forth in claim 8, wherein a lower fluid pressure limit of said second condition is said predetermined fluid pressure value and a lower pressure limit of said first condition is a pressure lower than said predetermined fluid pressure value.

* * * * *